(12) United States Patent
Hellén et al.

(10) Patent No.: US 6,415,745 B1
(45) Date of Patent: Jul. 9, 2002

(54) METHOD OF REDUCING NITROGEN OXIDE (NOX) EMISSIONS OF PISTON ENGINE

(75) Inventors: Göran Hellén; Seppo Tiensuu; Juha Kytölä ; Tapani Humalamaa, all of Vaasa (FI)

(73) Assignee: Wartsila Nsd Oy AB, Helsinki (FI)

( * ) Notice: Subject to any disclaimer, the term of this patent is extended or adjusted under 35 U.S.C. 154(b) by 0 days.

(21) Appl. No.: 09/620,759

(22) Filed: Jul. 21, 2000

(30) Foreign Application Priority Data

Jul. 21, 1999 (FI) .................................................. 991632

(51) Int. Cl.[7] .............................................. F02B 47/00
(52) U.S. Cl. ....................................................... 123/25 R
(58) Field of Search ........................................ 123/25 R

(56) References Cited

U.S. PATENT DOCUMENTS 3,818,876 A * 6/1974 Voogd ....................... 123/25 R
3,866,579 A * 2/1975 Serruys ..................... 123/25 A
4,176,632 A 12/1979 Franke
4,476,817 A * 10/1984 Lindberg ........................ 123/3

FOREIGN PATENT DOCUMENTS

EP 0 683 307 11/1995
SU 954583 9/1982

* cited by examiner

*Primary Examiner*—Tony M. Argenbright
*Assistant Examiner*—Katrina B. Harris
(74) *Attorney, Agent, or Firm*—John Smith-Hill; Smith-Hill and Bedell

(57) ABSTRACT

A method of reducing nitrogen oxide (NOx) emissions of a four-stroke turbo-charged piston engine by injecting water or steam into the combustion chamber of the engine, wherein the water injection is carried out at least substantially during the intake stroke of the engine. The injecting of water is initiated at the earliest when the inlet valve has moved through about 50% of the total range of its opening movement.

15 Claims, 1 Drawing Sheet

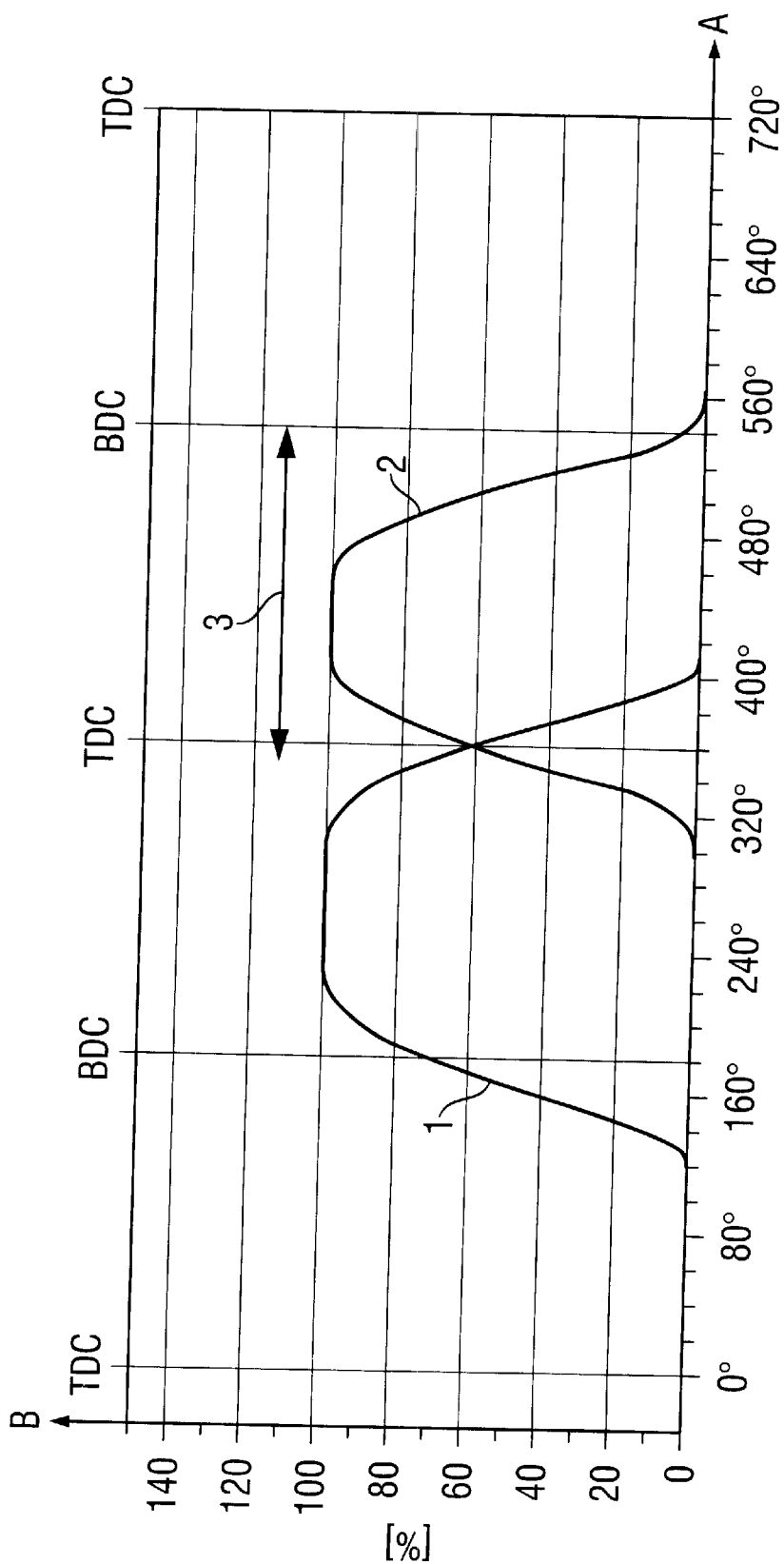

METHOD OF REDUCING NITROGEN OXIDE (NOX) EMISSIONS OF PISTON ENGINE

BACKGROUND OF THE INVENTION

The invention relates to an improved method of reducing nitrogen oxide (NOx) emissions of a four-stroke turbo-charged piston engine by injecting water or steam into a combustion chamber of the engine.

Nitrogen oxides (NOx), which are discharged into the air along with exhaust gases, are generated in the cylinders of a piston engine at high combustion temperatures. Due to the negative environmental effects of nitrogen oxide emissions it is desired to minimize such emissions.

It is known that formation of nitrogen oxides can be reduced by adding water into the combustion process of an internal combustion engine. This phenomenon is based on the cooling effect of the added water. In practice the injection of water into the combustion process of a piston engine has been realized by two alternative manners: the water is either injected directly into the combustion chamber of the cylinders of the engine or the water is introduced through an inlet air passage.

When the water is injected directly into the combustion chamber of the cylinder, the injection usually takes place during the compression stroke either before the actual combustion process and/or during the combustion. This injection interval is advantageous for reducing formation of nitrogen oxides and for avoiding reduction in power output of the engine, but disadvantageous for shaft efficiency of the engine. By means of this arrangement, a large quantity of water may be injected into the combustion chamber, whereby it is typically possible to decrease nitrogen oxides by as much as 50–60%. Additionally, undisturbed filling of the cylinder with air makes it possible to obtain great power output. However, the shaft efficiency of the engine suffers from injecting the water during the compression stroke because the cooling caused by water injection at the end stage of compression reduces the pressure of compressed air and/or the fuel/air mixture whereby the engine must perform compression work that can not be utilized during the expansion stroke. Another factor decreasing the shaft efficiency of the engine is the relatively high pressure needed for water injection, which must exceed the pressure prevailing in the cylinder at the time of injection and is typically about 200 bar.

Injecting water into the combustion chamber along with inlet air is traditionally accomplished by continuous humidification of the inlet air, or injecting water and/or steam into the flow of inlet air, at a location before or after the compressor of a turbocharger, before or after an inter-cooler, or in an inlet air chamber and/or inlet passage. These arrangements are advantageous with respect to shaft efficiency of the engine, but disadvantageous with respect to avoiding reduction in power output of the engine and also with respect to the required amount of water.

The quantity of water that can be introduced into the combustion chamber with the inlet air may be at most the quantity that remains in gaseous form at the pressure and temperature conditions of the inlet air. Thus, saturation of steam at the conditions of the inlet air limits the quantity of water that can be introduced into the combustion chamber along with the inlet air. In a modern turbo-charged inter-cooled engine the pressure of inlet air is typically about 4 bar and its temperature about 50° C. These conditions restrict the quantity of water that can be introduced to a level that in practice corresponds typically about a 10–40% reduction in quantity of nitrogen oxides. It is not desirable to reduce the pressure of the inlet air or increase the temperature of the inlet air in order to allow feeding of a greater quantity of water, because then the filling of the cylinder with combustion air and further the power output of the engine would suffer. The shaft efficiency of the engine instead remains undisturbed, because the work during the compression stroke may be recovered in the expansion stroke without disturbances. When water is introduced by continuous humidification of inlet air with the inlet air, the quantity of water required is relatively great, because some of the water exits the cylinder during the scavenging stage, when both the inlet valve and the exhaust valve are simultaneously open, and so cannot be utilized.

Document EP 0 683 307 A1 shows a device to inject water into a diesel engine depending on the movement of the inlet valve or piston. The device has water nozzles located in the vicinity of the inlet valve. The nozzles are opened in accordance with the firing sequence of the engine. The water is injected during the induction stroke controlled by a control unit using engine speed, piston position and/or engine operating condition as input parameters for injection. This device is still inadequate and its operation, particularly relating to emission reduction, is unsatisfactory.

A partial recirculation of combustion gases back to the combustion process is known for reducing nitrogen oxide (NOx) emissions. Recirculation may be realized either externally, in which the gas to be recirculated is brought from the exhaust passage, cooled and mixed with inlet air and is thus returned to the combustion process, or in principle also internally by proper timing of the inlet and outlet valves, so that the scavenging of the cylinder remains incomplete.

A benefit of the internal recirculation is its simplicity and advantageous implementation. Correspondingly, a disadvantage is increasing of thermal load of the combustion chamber, which may cause material problems for example in the form of heat corrosion and may also lead to the effect on nitrogen oxides being relatively small in practice. However, as such the recirculation of combustion gases does not provide adequate level of reduction of nitrogen oxide (NOx) emissions.

It is an object of the invention to provide an improved method of reducing nitrogen oxide (NOx) emissions of a four-stroke turbo-charged piston engine, which is based on injecting water or steam into the combustion chamber of the engine, but from which the drawbacks present in the prior art have been substantially eliminated. More specifically, it is an object of the invention to provide a method which, in addition to decreasing emission of nitrogen oxides, is advantageous in respect of shaft efficiency of the engine, in respect of power output and in respect of required quantity of water. It is a further object that by means of the method the reduction of nitrogen oxides may be combined in more efficient manner with internal recirculation of combustion gases.

SUMMARY OF THE INVENTION

According to the invention the water introduction, either in the inlet air or preferably by direct injection, is carried out at least substantially during the intake/stroke and is initiated at the earliest when the inlet valve has moved through about 50% of the total range of its opening movement. The reduction in pressure caused by the cooling effect of the water assists with filling of the cylinder with air or fuel/air mixture and thus reduces the work of the compressor, which is advantageous with regard to shaft efficiency and power output of the engine. With regard to shaft efficiency this is further advantageous since the work performed during the compression stroke may be recovered during the expansion stroke without adverse or negative effect. Additionally, in the case of direct injection, the injection pressure of the water may be maintained relatively low due to the low pressure in the cylinder, so that the injection pressure is only about one-fifth to one-tenth of the pressure that is required for injecting water during compression stroke.

It is possible in accordance with an additional aspect of the invention to further assist the reduction of nitrogen oxide emissions by arranging the movements of the exhaust valve and inlet valve so that some of the combustion gases remain in the combustion chamber of the engine.

Because the opening movement of inlet valve may begin, specifically due to scavenging, slightly before the piston reaches its top dead center and the inlet stroke begins, it is, by the timing of water injection according to the invention, possible to make sure that water is not unnecessarily consumed in the cylinder scavenging phase. Also, the water injection according to the invention effects also by cooling, which thus provides better possibilities for using internal recirculation.

Most preferably the injection of the water is accomplished by injecting it directly into combustion chamber. In this way the injection is technically totally independent of the opening and operation of the inlet valve.

An agent for cooling the combustion process and/or for reducing nitrogen oxides, for example urea and/or ammonia, may be dissolved in the water to be introduced into the combustion chamber, which further intensifies the reduction of nitrogen oxide emissions.

In order to take into consideration the different operation conditions of an engine, the initiation moment, amount and/or duration of injection of water injected, are regulated in accordance with required reduction of nitrogen oxides (NOx) and load and/or operating speed of the engine. Additionally, the humidity of the inlet air of the engine may be continuously measured or determined, and the quantity of injected water may be regulated in accordance with the humidity of the inlet air entering the engine.

The concentration of nitrogen oxide (NOx) in the exhaust gases of the engine may be continuously measured or determined and the quantity of injected water may also be regulated in accordance with nitrogen oxide (NOx) content measured of the exhaust gases, whereby it is possible to have the correct quantity of water injected during each respective water injection.

In order to improve the reduction of nitrogen oxides (NOx) a part of the combustion gases is allowed to remain in the combustion chamber of the engine or a so-called internal recirculation of combustion gases is practiced. In this case, by injecting water directly into combustion chamber and by the described timing of injection it is possible to decrease the heat stress of the combustion chamber and thus also enhance the reduction of nitrogen oxides (NOx).

In practice the injection of the water introduced may be accomplished in more than one stage. Thus, the quantity of water required for one operating cycle of the cylinder may be several discrete injections.

BRIEF DESCRIPTION OF THE DRAWINGS

The method according to the invention will be described with reference to a drawing, the single FIGURE of which is a graph illustrating by way of example the relative opening and closing movement of an exhaust valve and an inlet valve.

DETAILED DESCRIPTION

In the FIGURE, the rotation angle of the crankshaft of a four-stroke combustion engine is represented by axis A and the relative movement of the valves is represented by axis B.

The figure shows also the top dead center (TDC) and bottom dead center (BDC) of the piston. The relative movement of the exhaust valve has been denoted by the curve 1 and the relative movement of the inlet valve has been denoted by the curve 2. Additionally, there is shown a range 3, during which the initiation of water injection may most advantageously take place according to the invention. Termination of water injection may take place before or after the end of the range 3.

As can be seen from the figure, the starting and ending of the movement of the valves have not been fully synchronized in accordance with the top dead center and bottom dead center of the piston. In accordance with this manner of operation, for example the exhaust valve and the inlet valve may be simultaneously in the open position for a while, to allow scavenging of the cylinder. The timing of the exhaust valve and the inlet valve is utilized in internal recirculation of combustion gases so that the scavenging of the cylinder remains incomplete, whereby a part of the combustion gases remains in the cylinder and mixes with gases and water which are fed into the cylinder during an intake stroke for enhancing the reduction of nitrogen oxides (NOx) in combination with the timing of the initiation of injection of water to take place at the earliest when the inlet valve has shifted about 50% of the total range of its opening movement. In other words the exhaust valve and inlet valve are simultaneously in the open position in order to enhance the reduction of nitrogen oxides (NOx) by causing a part of the combustion gases to remain in the combustion chamber of the engine. Also, it can be seen from the figure that a substantial proportion of the water is injected after the piston has passed its top dead center (TDC) and while the exhaust valve is still open i.e. at that stage a combined internal combustion gas recirculation and water injection is practiced.

Detecting and deciding the respective amount of water required, based on the manner of operation and operation condition of the engine, the injection itself may be accomplished most simply by means of regular injection nozzle means directly into the cylinder according to the need in one or in several stages. Based on this, the end of the water injection may take place before or after the closing of the inlet valve. Mainly it is essential that the disadvantages relating to water injection, specifically at end of the compression stroke, are avoided.

The quantity of water to be injected can thus be changed according to factors like load of the engine, desired purity of exhaust gases etc. The ratio of the water to be injected to the amount of the fuel may typically be for example 1–3 by mass. By injecting water in accordance with the invention, nitrogen oxides (NOx) may be decreased typically 60–70% and combined with internal recirculation typically 70–80%.

The invention is not limited to the embodiments and numerical values shown but several modifications of the invention are reasonable within the scope of the attached claims.

What is claimed is:

1. An improved method of operating a four-stroke turbocharged piston engine in accordance with an operating cycle including an intake stroke, the piston engine having a combustion chamber and an inlet valve which is movable through a range between a closed position and an open position for admitting air to the combustion chamber, wherein the method comprises introducing water into the combustion chamber at least substantially during the intake stroke of the operating cycle of the engine, and the improvement resides in that the introduction of water commences no earlier than when the inlet valve has moved through about 50% of the range from its closed position to its open position.

2. A method according to claim 1, comprising introducing the water in vapor form.

3. A method according to claim 1, comprising introducing the water by injecting it directly into combustion chamber.

4. A method according to claim 1, comprising regulating the initiation moment, quantity or duration of introduction of water in accordance with required reduction of nitrogen oxides (NOx) and load or operating speed of the engine.

5. A method according to any claim 1, comprising continuously determining humidity of inlet air of the engine and regulating the amount of introduced water in accordance with the humidity of the inlet air.

6. A method according to claim 1, comprising regulating the quantity of introduced water in accordance with nitrogen oxide (NOx) content measured from exhaust gases.

7. A method according to claim 1, comprising controlling movement of the exhaust valve and inlet valve so that a part of the combustion gases remains in the combustion chamber of the engine in order to enhance the reduction of nitrogen oxides (NOx).

8. A method according to claim 1, comprising controlling movement of the exhaust valve and inlet valve to effect internal combustion gas recirculation.

9. A method according to claim 1, comprising controlling movement of the exhaust valve so that it remains open after the piston passes its top dead center (TDC) and introducing a substantial quantity of water after the piston has passed TDC and while the exhaust valve is still open.

10. A method according to claim 1, comprising introducing the water in more than one stage.

11. A method according to claim 1, wherein the ratio of the quantity of water to be introduced to the quantity of fuel is 1–3 by mass.

12. A method according to claim 1, comprising introducing water having an agent for cooling the combustion process dissolved therein into the combustion chamber.

13. A method according to claim 1, comprising introducing water having an agent for reducing nitrogen oxides dissolved therein into the combustion chamber.

14. A method according to claim 1, comprising introducing water having urea dissolved therein into the combustion chamber.

15. A method according to claim 1, comprising introducing water having ammonia dissolved therein into the combustion chamber.

* * * * *